US006807513B2

(12) United States Patent
Sandjivy

(10) Patent No.: US 6,807,513 B2
(45) Date of Patent: Oct. 19, 2004

(54) METHOD FOR DETERMINING A SPATIAL QUALITY INDEX OF REGIONALIZED DATA

(75) Inventor: Luc Sandjivy, Fontainebleau-Avon (FR)

(73) Assignee: Earth Resource Management (ERM.S) (FR)

(*) Notice: Subject to any disclaimer, the term of this patent is extended or adjusted under 35 U.S.C. 154(b) by 57 days.

(21) Appl. No.: 10/371,261

(22) Filed: Feb. 21, 2003

(65) Prior Publication Data

US 2003/0163284 A1 Aug. 28, 2003

(30) Foreign Application Priority Data

Feb. 27, 2002 (FR) ............................................. 02 02578

(51) Int. Cl.⁷ .............................................. G06F 19/00
(52) U.S. Cl. ........................................ 702/182; 714/25
(58) Field of Search ...................... 702/182, 97, 159, 702/165, 189, 14, 18, 109, 191, 196; 367/38, 59; 342/25, 179; 714/2, 5, 25, 26

(56) References Cited

U.S. PATENT DOCUMENTS

| | | | | |
|---|---|---|---|---|
| 5,121,337 A | * | 6/1992 | Brown .......................... | 702/28 |
| 5,446,681 A | * | 8/1995 | Gethner et al. ................ | 702/27 |
| 6,185,512 B1 | | 2/2001 | Lambrecht .................... | 702/97 |

OTHER PUBLICATIONS

Abarca–Hernandez F et al. "Evaluation of Geostatistical Measures of Radiometric Spatial Variability for Lithologic Discrimination in Landsat TM Images" Photogrammetric Engineering and Remote Sensing. American Society for Photogrammetric and Remote, US, vol. 65, No. 6, juin 1999 (Jun. 1999), pp. 705–711, XP008009097.

Sandjivy L: "The Factorial Kriging Analysis of Regionaized DAA, TIS Application to Geochemical Prospecting" Nato ASI Series, Series C: Mathematical and Physical Sciences, Reidel, Dordrecht, NL, vol. 122, No. part 1, 1984, pp. 559–571, XP008008289.

* cited by examiner

*Primary Examiner*—Hal Wachgman
*Assistant Examiner*—Edward Raymond
(74) *Attorney, Agent, or Firm*—William A. Drucker

(57) ABSTRACT

The method of the invention includes the following stages:
a first stage for identifying the first order statistical anomalies on the basis of a set of raw regionalized data,
a second stage for identifying second order statistical anomalies on the basis of the first order anomalies with extraction of the components considered as anomalistic components and components considered as coherent in space,
establishing a quantified relation between any combination of the estimated values of the anomalistic components of the first and/or second order and any combination of the estimated values of the coherent components of the first and/or second order. The method can be applied in particular to geophysical data, image data obtained by physical methods or even to any type of sampling of natural phenomena.

11 Claims, 5 Drawing Sheets

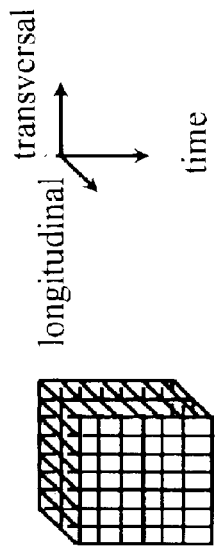
FIG. 2c
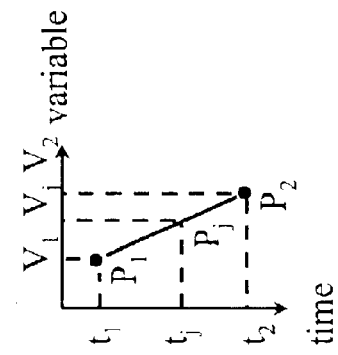
FIG. 5
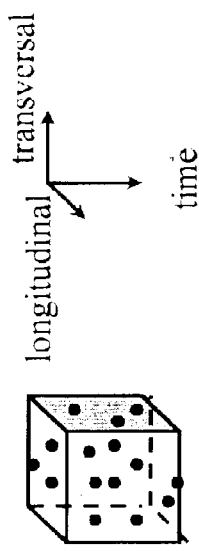
FIG. 2a
FIG. 2b
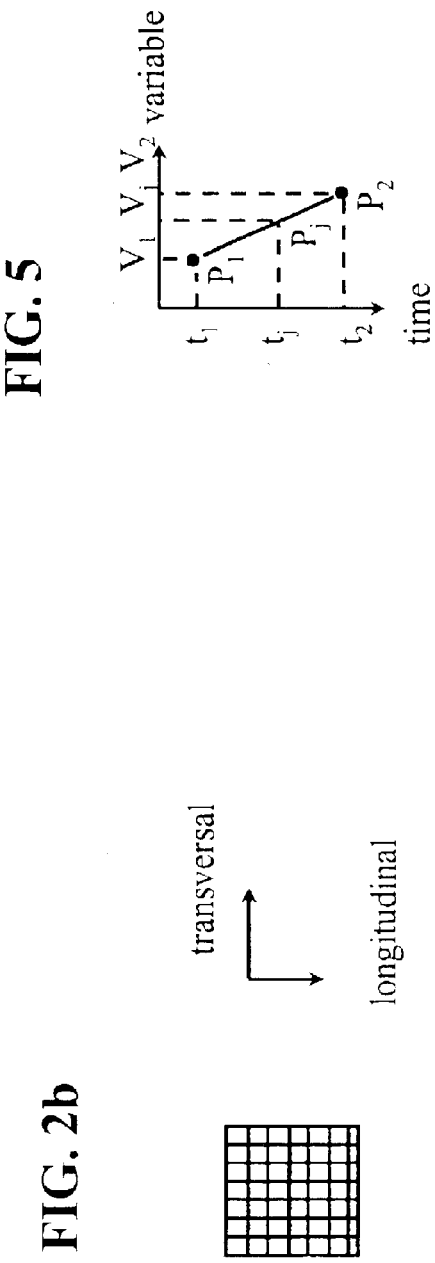

METHOD FOR DETERMINING A SPATIAL QUALITY INDEX OF REGIONALIZED DATA

BACKGROUND OF THE INVENTION

1. Field of the Invention

The present invention concerns a method for determining a spatial quality index of regionalised data.

It can be applied more particularly, but not exclusively, to geophysical data, image data obtained by physical methods, such as medical or sonar methods, the non-destructive control of materials, or even to any type of sampling of natural phenomena, such as mines recognition campaigns, geochemical inventories, pollution sensors, satellite data, oceanographic data, water analysis, etc.

2. Description of the Prior Art

The regionalised data is data marked by coordinates inside a space with N dimensions, that is most currently in a one, two or three dimensional geographical space. This data can be either mono or multivariable, that is that one or several variables are measured or calculated at the data points.

The theory of regionalised variables is known under the name of geostatistics. Geostatistics involves applying probabilities to natural phenomena which develop in space over a period of time, hence the prefix 'geo'. This theory is shown in detail in the work entitled "The theory of regionalised variables" by G. MATHERON (Publisher MASSON).

This theory provides the appropriate language and tools for estimating any quantity, a priori unknown, and able to be marked in a given space on the basis of a forcefully fragmentary sampling of this same quantity.

So as to estimate this unknown quantity, geostatistics makes it possible to suitably select the most appropriate probabilistic model for the situation, the geostatistical estimator being known under the name of "krigeage".

More than the estimation, the probabilistic model also gives an indicator of the accuracy of the estimate. This indicator, known as estimate variance, is a vital tool as it opens the way for a possible control of uncertainties (translated in variance terms).

Within the context of stationary probabilistic models, which assumes the invariance by translating in space the average of the modelised variable, the covariance tool or variogramme is used to quantify the spatial variability of the data.

For a non-stationary model, generalised covariance is used.

The geostatistical models also make it possible to validly anticipate concerning a future state, for example the exploitation of natural resources, when the data available shall be more numerous and the operator needs to deal with estimating problems.

Irrespective of the context for exploiting natural resources, the question here still concerns whether there is sufficient data available to resolve the operational problem.

Added to the intrinsic quality of each data item is the quality of the spatial integration of this data element inside the whole set of data. This is why it is advantageous to complete the experimental reading by a geostatistical control associated with geographical, time or other types of coordinates.

The usual methods for controlling the quality or coherence of sets of regionalised data are either visual or morphological (studies of shapes) or statistical (without taking into account the spatial coordinates). When they are used, filtering methods (frequency or spatial) generally work on monovariable data and on regular grids. As a result, they are ill-adapted to the breaking up of multivariable data irregularly situated in space into anomalistic and coherent components;

Similarly, the definition of the criteria used to define the anomalies is often arbitrary and ill-adapted to experimental verification.

OBJECT OF THE INVENTION

So as to eliminate these drawbacks, the invention proposes quantifying the spatial quality of a set of regionalised data by virtue of determining a geostatistical index known as a "Spatial Quality Index" (SQI) being used to localise a priori anomalistic data and thus judging the quality of the measurements or of the digital processing which have generated the set of data.

The determination of the SQI resolves both the problem of interpretation of the spatial variations of the mono or multivariable data in general terms of anomalies and coherent component and an estimate of the degree of anomalistic or spatial incoherence present in each data element taken individually. The determination of the SQI does not assume any particular arrangement of the data in space and also fully works on data irregularly distributed in space and also on data regularly situated at the nodes of a grid with N dimensions, for example a three-dimensional acquisition grid for acquiring irregularly distributed geophysical data is defined along two data acquisition transversal/longitudinal axes and a third time vertical axis.

SUMMARY OF THE INVENTION

Advantageously, this index is determined by means of the method of the invention which includes the following operational stages:

a first phase for identifying the statistical anomalies of a first order on the basis of a set of raw regionalised data, this identification including a stationing of the data via a preliminary extraction of the spatial drifts of said data and the determination of the associated stationary residue of first order so that the value of the average of the residual data is reasonably constant in space, the anomalies being identified and examined on the first order residue so as to provide a first order anomalistic criterion, a second phase for identifying a second order statistical anomalies with extraction of the components of first order residue considered as anomalies and the components of first order residue considered as coherent in space, the establishment of a quantified relation (SQI) between any combination of the estimated values of the anomalistic components of the first and/or second order and any combination of the estimated values of the coherent components of the first and/or second order, the localisation of space anomalies on the basis of the values of the SQI of each regionalised data element.

Advantageously, said drawing up of a quantified relation constitutes the determination for each regionalised data element taken individually of the ratio of a spatial quality index (SQI).

Of course, said identification stages could be carried out by a geostatistical estimation (krigeage) in a non-stationary model for the first phase and in a stationary model for the second phase.

In the first phase, the non-stationary estimation of the spatial drift makes it possible to obtain first order stationary residue on which it is possible to validly calculate and modelise a variogramme.

The interpretation of this variogramme in terms of coherent and anomalistic components results in the estimation per stationary model of the second order anomalistic component.

More particularly, the stationary and non-stationary geostatistical models could use:

the estimation by factorial krigeage of the anomalistic and coherent components of the residue, the definition of the krigeage surrounding area adapted to the estimation of each of said anomalistic and coherent components.

Of course, in each of said stages, the analysis could be facilitated by a 3D visual control carried out firstly by an interpolation on a "grid" file of any irregularly sampled variable originating from a "point" file, and secondly with by means of a colour code associated with the value of the inserted variable.

BRIEF DESCRIPTION OF THE DRAWINGS

One embodiment of the invention appears hereafter and is given by way of non-restrictive example with reference to the accompanying drawings on which:

FIGS. 2a, 2b and 2c represent various file formats used in the method of the invention;

FIG. 5 represents the interpolation made to allow the displays of FIG. 4;

DESCRIPTION OF THE PREFERRED EMBODIMENTS

This example more particularly concerns the acquisition and processing of 3D seismic data for characterising petrol tanks and more. particularly the quality control of measurements of geophysical speeds or "stack" speeds.

The problem is as follows: the seismic contractor offers the petrol operator a set of speeds set up manually for the "stack" operation which conditions the quality of the final data. The petrol operator is responsible for monitoring the work of the contractor and shall give his opinion concerning the quality of the speed set-up.

To this effect, he can examine the cubes of "stack" speeds set-ups with the aid of statistical and geophysical tools so as to identify the spatial incoherences due to erroneous set-ups.

The determination of the SQI in accordance with the method of the invention contributes in defining the set-ups considered as anomalistic set-ups fit for resetting-up so as to guarantee a spatial homogeneity which shall be quantified by the SDI index value.

Each "stack" speed set-up is defined by its spatial coordinates—geographic and temporal—and a geophysical speed value. Inside the spatial field described by all the set-ups, a probabilistic modelisation makes it possible to separate a spatial noise, possibly organised, of a coherent signal (spatially). The spatial noise is supposed to correspond to processing and acquisition artifacts. Quantified, it makes it possible to quickly identify the problematic set-ups according to a tolerance threshold deduced from geophysical quality or other (for example in a "stack" case, preservation of the amplitudes of the seismic signal) requirements.

Figure 1:
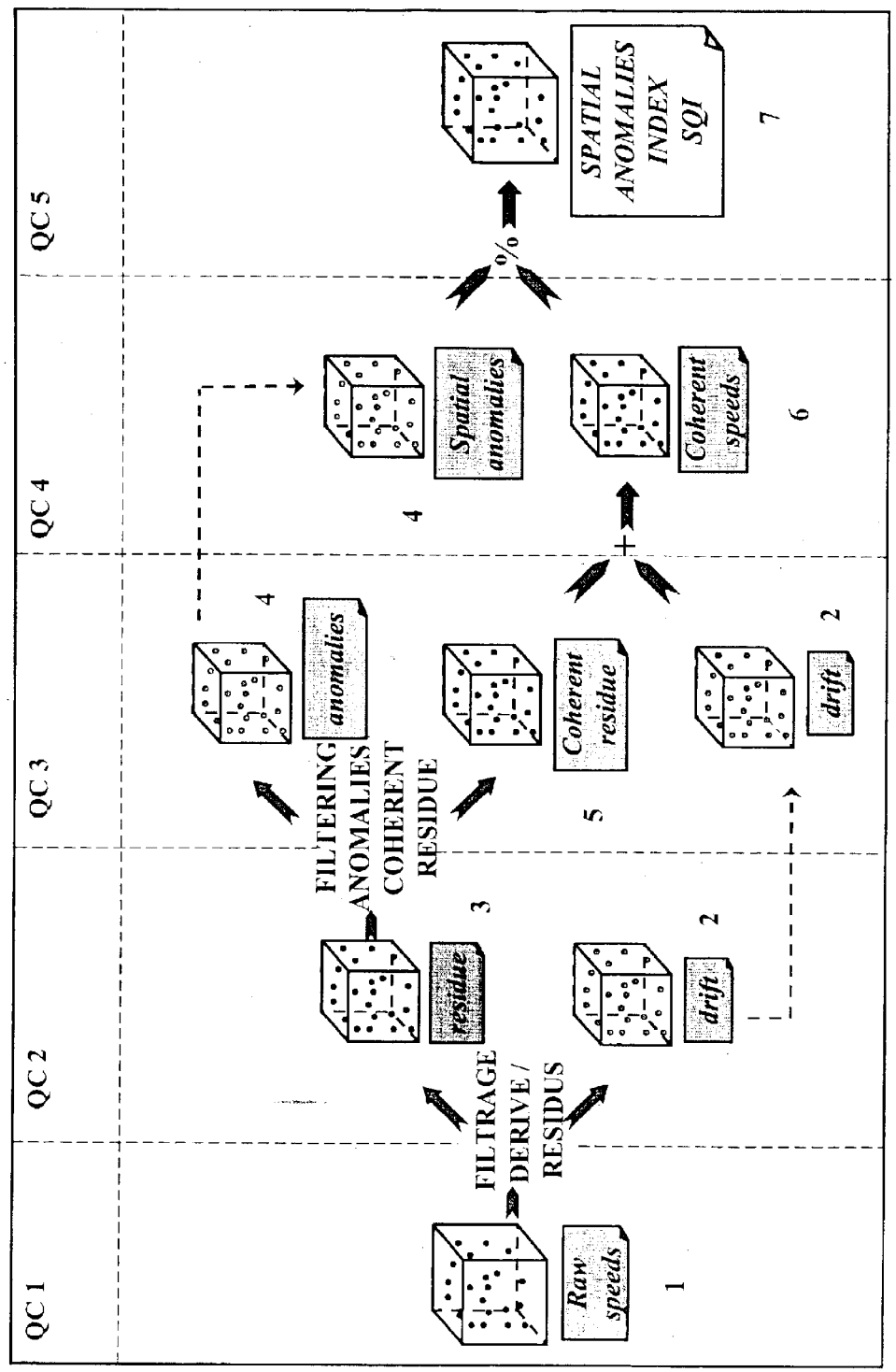
FIG. 1 is a diagrammatic representation illustrating the main phases for determining the spatial quality index (coefficient of spatial anomalies) inside a geophysical data processing context.

In the process for determining the SQI index shown on FIG. 1, the system of coordinates retained is the seismic longitudinal axis (inline)—transversal axis (crossline)—time system (FIG. 2a). In fact, the entire geophysical chain, from acquisition to seismic processing, favours these three main directions: vertical (time) and the horizontal directions (inline, crossline) defined by the acquisition device. As a result, most of the acquisition and processing artifacts are generated along these directions and the analysis is orientated along these directions. This process thus makes it possible to reduce the determination time.

Figure 4:
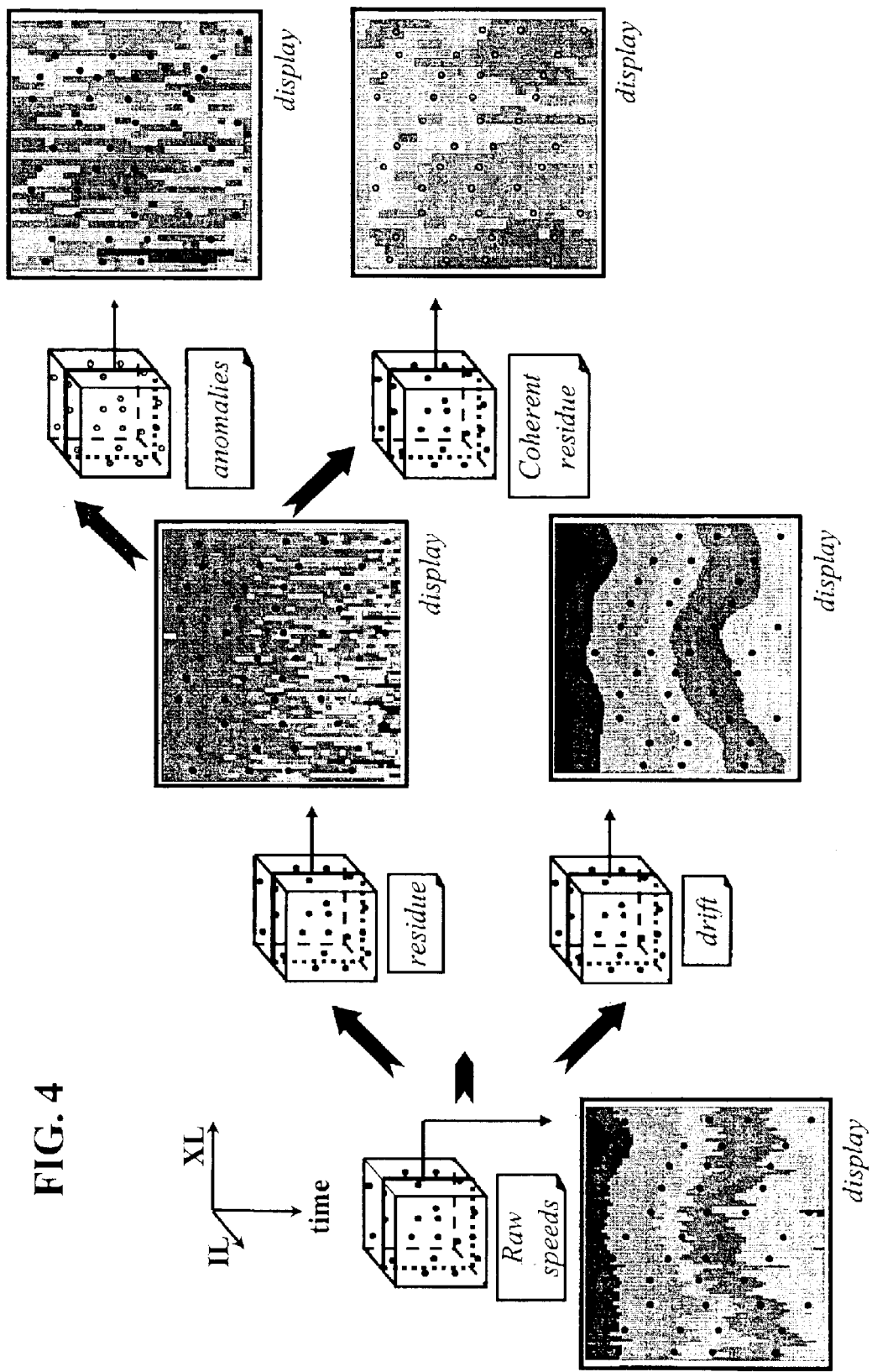
FIG. 4 represents displays allowing a visual control of the stages of the method.

More specifically, the process introduces three types of files:

a 3D "point" file (cube of "stack" speed set-ups) (FIG. 2a) defined by all the positions of speed set-ups in a system of coordinates longitudinal axis (inline)—transversal axis (crossline)—time, is generally at regular step in the horizontal plane (longitudinal axis (inline)—transversal axis (crossline)) and irregular in time, a 2D "grid" file (FIG. 2b): with regular step and defined according to the longitudinal (inline)—transversal (crossline) axes and used to produce directional statistics along the vertical (time axis of the 3D point file of FIG. 2a); statistics according to the longitudinal direction or transversal direction are possible, a 3D "grid" file (FIG. 2c): with regular mesh in a system of coordinates (longitudinal axis (inline)—transversal axis (crossline)—time) and used for various displays, as explained subsequently (FIG. 4).

In accordance with the methodology shown on FIG. 1, once the cube of "stack" speed set-ups is loaded, it is subjected to a geostatistical quality control (calculation of SQI). The raw speeds 1 are broken down into the first order by factorial "krigeage" into a spatial drift 2 ("low frequency" component) and stationary residue 3 (QC1 phase). The spatial coherence of the first order residue is modalised (with the aid of a variogram) (QC2 phase) for embodying a discriminating filtering via the factorial "krigeage" between a spatial noise 4, that is a second order residue, and a second order coherent portion 5 considered to be "cleaned" from the processing and acquisition artefacts (QC3 phase). This second order coherent residual portion is added to the drift 2, that is the first order coherent portion, so as to generate a cube of spatially coherent speeds set-ups 6 (QC4). In this example, the SQI is constituted by the ratio between the second order residue noise and the coherent portion of the data element, that is the sum of the coherent components of the first and/or second order and result in obtaining a spatial anomalistic cube 7 (QC5 phase): each set-up is thus characterised by its spatial quality index (SQI) which expresses the spatial noise percentage with respect to the spatially coherent portion.

The experimental statistics calculated during the process are broken down into:

basic statistics, directional statistics, experimental variogram.

All the "stack" speeds set-ups and the first order residues form distributions which can be quickly analysed by tools taking various parameters into account, such as its number of samples, its extreme points, its arithmetic mean, its standard deviation, its variance:

its number of samples N which characterises a distribution $V_i$ (raw speeds, residues, drifts, anomalies, filtered residues, filtered speeds . . . )

its extreme points:
minimum=min $(V_i)$
maximum=max $(V_i)$ its arithmetical mean:

$$m = \frac{1}{N}\sum_{i=1}^{N} V_i$$

its standard deviation:

$$\sigma = \sqrt{\frac{1}{N}\sum_{i=1}^{N}(V_i - m)^2}$$

its variance:

$$\sigma^2 = \frac{1}{N}\sum_{i=1}^{N}(V_i - m)^2$$

Figure 3A:
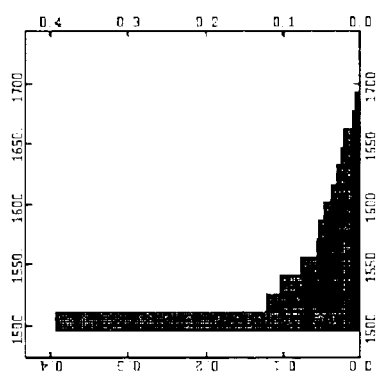
FIGS. 3a and 3b respectively represent a target diagram (FIG. 3a) and a speed/time diagram (FIG. 3b)
Figure 3B:
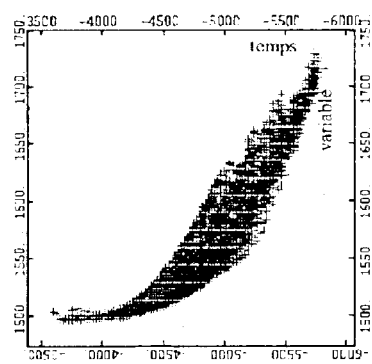

This analysis can be completed by using:
a target diagram in which the values $V_i$ of the variable are grouped into categories, the target diagram representing frequencies corresponding to these categories (FIG. 3a),
a time/speed diagram ("cross-plot") (FIG. 3b)

It is known that the acquisition and processing artefacts have as main axes the longitudinal, transversal and time axes. The calculation of a statistical magnitude along one of these three directions can result in identifying one or several reinforced artefacts. As a result, the three statistical magnitudes calculated along these directions could be limited to the number of samples, the arithmetical mean ands the variance (or standard deviation).

Added to the previously mentioned analysis tools is the first order residue experimental variogram. The variogram is able to quantify the spatial correlation of a regionalised variable $V(\vec{r})$, r being the position vector defined in the longitudinal-transversal-time system of coordinates. Its formula is deduced from that of the theoretical variogram which concerns the random function $V(\vec{r})$ for which there is only one embodiment: the regionalised variable.

Theoretical variogram:

$$\gamma(\vec{h}) = \frac{1}{2}\text{Var}[V(\vec{r} + \vec{h}) - V(\vec{r})]$$

where $\vec{h}$ is the vector characterising a set of pairs of set-ups

Experimental variogram (after stationary and ergodicity hypotheses):

$$\Gamma(\vec{h}) = \frac{1}{2N(\vec{h})}\sum_{n=1}^{N(\vec{h})}[V(\vec{r}_n + \vec{h}) - V(\vec{r}_n)]^2$$

where $N(\vec{h})$ is the number of pairs of set-ups separated from $\vec{h}$.

Moreover, the analysis could be facilitated by using the display mode shown on FIG. 4.

According to this display mode, interpolation on grid (with regular steps) of any irregularly sampled variable ("point" file) allows, by means of a colour code associated with the value of the interpolated variable, a quick 3D visual control.

The interpolation retained by display is defined as follows (FIG. 5): at one grid node $P_j$, the estimated value corresponds to the linear interpolation of the two set-ups $P_1$, $P_2$ respectively defined by the nearest coordinates $(t_1, V_1)$ and $(t_2, V_2)$ situated on both sides of the node $P_j$ and on the same vertical line as the latter.

$$V_j = V_1 + \left(\frac{t_j}{t_2 - t_1}\right) \times (V_2 - V_1)$$

Other more elaborate types of interpolation, such as "krigeage," could be possible for display if required.

The stages for filtering and determining the anomalies used in the methodology shown on FIG. 1 are described hereafter:

a) Drift/residue filtering stage

A field of speeds generally has a vertical drift due to compaction, this compaction being the increase of the speed according to the increase of the penetration depth (a horizontal drift may also exist, if the sea bottom, for example, is considered for acquiring marine seismic data). A non-stationary state of speeds is observed in this direction which can be managed by the theory of generalised covariances, a non-stationary geophysical model. But a generalised covariance cannot be interpreted directly in terms of anomalistic and coherent spatial components, thus rendering it impossible to adjust a model. Therefore, it is necessary to extract this drift and work on the associated stationary residue.

The extraction of a drift ensuring the stationary state of the residue is embodied by least error squares polynomial adjustment which is a particular case of factorial krigeage: the value of the drift at a point in space corresponds to the value of a polynomial adjusting as best as possible (least error squares) the points (independent) belonging to a surrounding region centered around the point to be estimated. The type of the polynomial—1 z, 1 z $z^2$, 1 x z $x^2$ $z^2$ xz, etc—is to be determined according to the type of drift it is desired to extract, z being the time and x being a geographical coordinate. The dimensions of the krigeage extraction surrounding region shall guarantee the stationary state of the first order residue.

Example: extraction of a type 1 z $z^2$ drift at the point $\vec{r}_0$:

$$V_{drift}(\vec{r}_0) = a + b \times z_0 + c \times z_0^2 \text{ with } \vec{r}_0(x_0, y_0, z_0)$$

The coefficients of the polynomial (a, b and c) are obtained by minimising the system:

$$\sum_{i=1}^{N_V} \left[ (a + b \times z_i + c \times z_i^2) - V(\vec{r}_i) \right]^2$$

where $N_V$ is the number of samples contained in the surrounding region centered around the point to be estimated.

b) Coherent residue/anomalies filtering

The drift, a first order coherent component, previously estimated, is subtracted from the raw "stack" speeds. The first order residues shall be stationary.

$$V_{residue}(\vec{r}_0) = V(\vec{r}_0) - V_{drift}(\vec{r}_0)$$

The variographic analysis of the first order residues is the crucial phase of spatial quality control.

Figure 6:
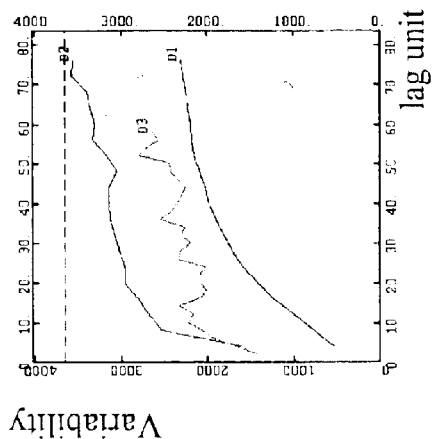
FIG. 6 represents an experimental residue variogram.

The experimental variogram of the residues $\Gamma(\vec{h})$ is calculated in several directions. For reasons of providing clarity of the figures, only the components in the three main directions (longitudinal, transversal, time) are shown on FIG. 6.

The modelisation of the variogram is subordinate to an interpretation of the experimental variogram in terms of coherent and anomalistic spatial components. The combined skills of the geostatistician, the geohphysicist and possibly the geologist are required for this interpretation phase. The geologist provides information concerning the known or assumed geological structures, the geophysicist specifies the nature of the major geophysical artefacts likely to affect the data, and the geostatistician constructs the variogram model by taking into account these two types of information.

Ideally, it would be better to separate a spatial noise (anomalistic spatial component) from a coherent signal (coherent spatial component) solely on the basis of a variographic interpretation. The modelisation put forward depends on the application for producing a set of speeds ("stack", depth conversion, DIX speeds . . . ). A spatial component can be considered as a noise for a certain application or as a coherent signal for another. The terms "coherent" and "anomalistic" are not intrinsic properties of the set of speeds but are the properties of the set of speeds within the context of the recognised geostatistical model.

The adjustment of the model $\Gamma^M(\vec{h})$ can only be effected by conditional negative standard functions. Initially, the variogram models, like the nugget effect model and the exponential and spherical models, are sufficient to construct an extendable model (with several components). The definition of the models is given in the isotropic case:

Nugget effect model:

$$\Gamma(\vec{h}) = \begin{cases} 0 & si\, |\vec{h}| = 0 \\ b & si\, |\vec{h}| > 0 \end{cases}$$

Spherical model:

$$\Gamma(\vec{h}) = \begin{cases} 0 & si\, |\vec{h}| > a \\ b \times \left[ \frac{3}{2} \times \frac{|\vec{h}|}{a} - \frac{1}{2} \times \left( \frac{|\vec{h}|}{a} \right)^3 \right] & si\, 0 \leq |\vec{h}| \leq a \end{cases}$$

Exponential model:

$$\Gamma(\vec{h}) = b \times \left[ 1 - \exp\left( -\frac{|\vec{h}|}{a} \right) \right]$$

The parameters a and b respectively are termed the range and stage of the variogram and are both positive.

The retained variogram model $\Gamma^M$ is a linear combination of various elementary components selected according to their coherent or anomalistic interpretation:

$$\Gamma^M(\vec{h}) = \Gamma_A(\vec{h}) + \Gamma_C(\vec{h})$$

with $\Gamma_A$ a component of the variogram associated with the anomalistic portion, $\Gamma_C$ a component of the variogram associated with the coherent portion.

Surrounding Area

The surrounding area combines all the points taking part in estimating the anomalistic component situated at the point $\vec{r}_0$.

A sliding surrounding area is essential for any filtering operation. A single surrounding area including all the samples of the field is extremely penalising concerning the calculation time. The dimensions of the sliding surrounding area thus need to optimise the calculation time without deteriorating the quality of the estimate.

Factorial Krigeage

The modelisation of the second order variogram of the residue corresponds to an interpretation in terms of anomalistic and coherent components. The factorial krigeage allows an estimate of each of the two components.

The estimate of the anomalistic component at the point $\vec{r}_0$ is carried out by calculating:

$$V_{anomalistic\ residue}(\vec{r}_0) = \sum_{\alpha=1}^{N_V} \lambda_\alpha \times V_{residue}(\vec{r}_\alpha)$$

where all the $\vec{r}_\alpha$ a constitute the sliding krigeage surrounding area and where the krigeage weights are determined by resolving the system:

$$\begin{cases} \sum_{\beta=1}^{N_V} \lambda_\beta \times \Gamma^M(\vec{r}_\alpha - \vec{r}_\beta) + \mu_A = \Gamma_A(\vec{r}_\alpha - \vec{r}_0) \\ \sum_{\beta=1}^{N_V} \lambda_\beta = 1 \end{cases} \quad \text{for } \alpha = 1, \ldots, N_V$$

The estimation of the coherent component at the point $\vec{r}_0$ can be obtained similarly by factorial krigeage. So as to find the corresponding krigeage weights, it suffices to change $\Gamma_A$ by $\Gamma_C$ in the krigeage system.

However, a single filtering is required since by means of the factorial krigeage, the following can be written:

$$V_{coherentresidue}(\vec{r}_0) = V_{residue}(\vec{r}_0) - V_{anomalistic\ residue}(\vec{r}_0)$$

c) Quantification of spatial anomalies

Calculation of the Spatial Anomaly Coefficient

The spatially coherent portion of the second order residue added to the drift, a first order coherent component, makes it possible to generate a spatially coherent field of speeds:

$$V_{coherent}(\vec{r}_0) = V_{drift}(\vec{r}_0) + V_{coherent\ residue}(\vec{r}_0)$$

The ratio between an estimation of the anomalistic component and an estimation of the coherent component of the data element (expressed in %) constitutes a ratio known as a spatial anomaly coefficient or spatial quality index SQI. It is attached to each speed set-up.

Figure 7B:
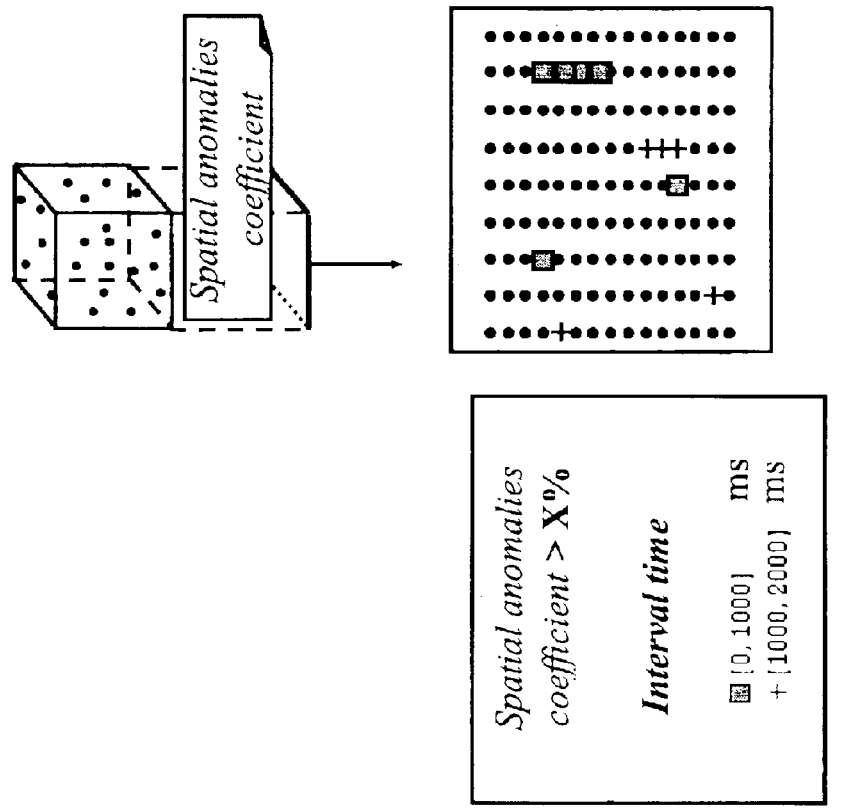
FIGS. 7a and 7b represent spatial anomalistic quantification and localisation modes.
Figure 7A:
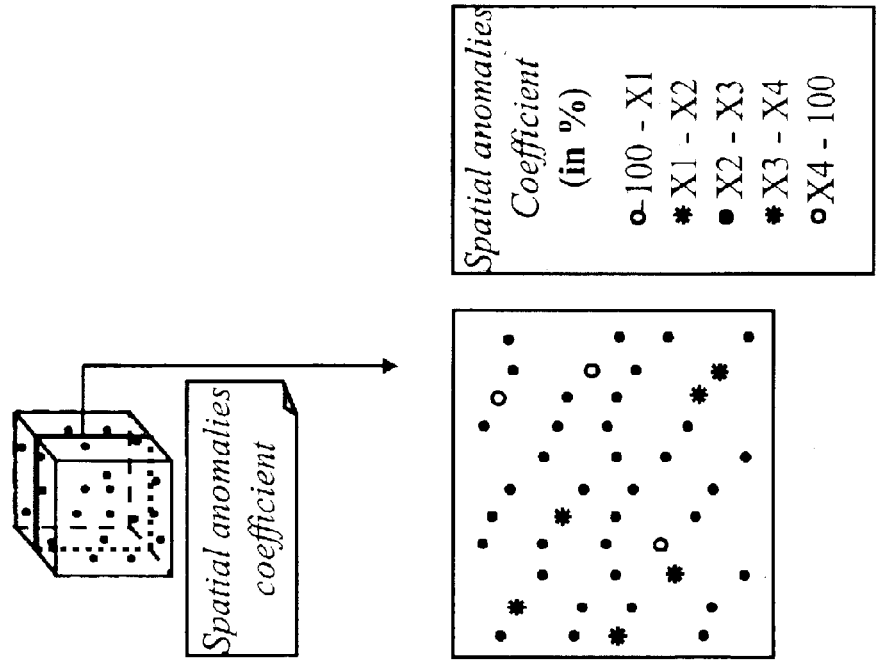

SQI attached to the stack speed set-ups:

$$V_{spatial\ anomaly\ coefficient}(\vec{r}_0) = \frac{V_{anomalisticresidue}(\vec{r}_0)}{V_{coherent}(\vec{r}_0)} \times 100$$

d) Localisation of the anomalistic points via interpretation of the spatial anomaly coefficient The localisation of the spatial anomalies is made on the basis of the spatial anomaly coefficient attached to each set-up of the speed cube. Two options are possible:

- in the first case, two categories of colours (or symbols) are associated with the spatial anomaly coefficient SQI. Sections in the cube are displayed. It is also possible to interpolate on the grid the spatial anomaly coefficient (FIG. 7a).
- in the second case, the colour (or symbolic) coding relates to the definition of time intervals possibly containing spatial anomaly coefficients greater than a threshold value (FIG. 7b).

What is claimed is:

1. Method for determining a spatial quality index of regionalised data and intended for determining a priori anomalistic data and accordingly assess the quality of the measurements or of the digital processing which have generated said data, comprising the following operational phases:

a first phase for identifying the first order statistical anomalies from a set of raw regionalised data, this identification including a rendering said data stationary by a preliminary extraction of the spatial drifts of said data and the determination of the associated first order stationary residue so that the value of the average of the residual data is reasonably constant in space, the anomalies being identified and examined on the first order residue so as to provide a first order anomaly criterion, a second phase for identifying the second order statistical anomalies with extraction of the components of first order residue regarded as anomalistic and components of first order residue regarded as coherent in space, setting up a quantified relation between any combination of the estimated values of the anomalistic components of the first and/or second order and any combination of the estimated values of the coherent components of the first and/or second order.

2. Method according to claim 1, wherein the setting up of the quantified relation is embodied for each regionalised data element taken individually.

3. Method according to claim 1, wherein said quantified relation is a ratio.

4. Method according to claim 1, wherein said quantified relation is the ratio between the estimated value of the second order anomalistic component and the estimated value of the coherent component is the sum of the first and second order coherent components.

5. Method according to claim 1, wherein said it includes the localisation of the spatial anomalies on the basis of the values of the SQI of each regionalised data element.

6. Method according to claim 1, wherein said identification phases are carried out by geostatistical estimation in a non-stationary model for the first phase and in a stationary model for the second phase.

7. Method according to claim 1, wherein obtaining first order stationary residue, on which it is possible to calculate and modelise a variogram, is carried out via a non-stationary estimation of the spatial drift.

8. Method according to claim 7, wherein the interpretation of said variogram in terms of anomalistic and coherent components results in the estimation by a stationary model of the second order anomalistic component.

9. Method according to claim 1, wherein said identification phases use:

the definition of the krigeage surrounding area adapted to the estimation of each of said anomalistic and coherent components, the estimation by factorial krigeage of the anomalistic and coherent components of the residue.

10. Method according to claim 1, wherein, in each of said stages, a 3D visual control of the analysis is carried out by firstly an interpolation on a "grid" file of any irregularly sampled variable originating from a "point" file, and secondly by means of a colour code associated with the value of the interpolated variable.

11. Method according to claim 1, wherein the extraction of a drift ensuring the stationary state of the residue stationary is effected via least error squares polynomial adjustment.

* * * * *